United States Patent [19]

Marchaix et al.

[11] 4,176,678
[45] Dec. 4, 1979

[54] SAFETY DEVICE FOR VENTING A FUEL TANK

[75] Inventors: Raymond Marchaix, Paris; Alain Le Cun, Crespiere, both of France

[73] Assignee: Regie Nationale des Usines Renault, Boulogne-Billancoult, France

[21] Appl. No.: 857,936

[22] Filed: Dec. 6, 1977

[30] Foreign Application Priority Data

Dec. 6, 1976 [FR] France .................... 76 36642
Jun. 29, 1977 [FR] France .................... 77 19914
Sep. 16, 1977 [FR] France .................... 77 28106

[51] Int. Cl.² .................................. F16K 15/14
[52] U.S. Cl. ......................... 137/493; 137/39; 137/845
[58] Field of Search ............... 137/493, 845–850; 220/209

[56] References Cited

U.S. PATENT DOCUMENTS

| 2,894,530 | 7/1959 | Stevens | 137/850 X |
| 2,896,661 | 7/1959 | Becker | 137/845 X |
| 3,066,767 | 12/1962 | Djordjevitch | 137/847 X |
| 3,138,173 | 6/1964 | Hartman | |
| 3,151,626 | 10/1964 | Everett | 137/845 X |
| 3,155,110 | 11/1964 | Hoffman | 137/846 X |
| 3,478,922 | 11/1969 | Mole | |
| 3,811,466 | 5/1974 | Ohringer | 137/845 X |
| 4,003,398 | 1/1977 | Duveau | 137/845 X |

FOREIGN PATENT DOCUMENTS 603329 4/1926 France .
1540096 4/1968 France .

Primary Examiner—Robert G. Nilson
Attorney, Agent, or Firm—Oblon, Fisher, Spivak, McClelland & Maier

[57] ABSTRACT

A safety device for venting a fuel tank, especially for automobiles comprising a natural or artificial elastomer diaphragm resistant to hydrocarbons, pierced by slits, held between the flanges of two concentric cylindrical elements constituting a valve body, a clearance being provided between the membrane and the flanges framing it so as to avoid having the latter cause stresses in the said membrane which would lead to deformation of the slits and would modify in an unpredictable manner gas flow passing through it.

11 Claims, 18 Drawing Figures

SAFETY DEVICE FOR VENTING A FUEL TANK

BACKGROUND OF THE INVENTION

The present invention relates to a safety device for venting a fuel tank, particularly for automobiles.

The problem of venting a fuel tank is known. One must in effect permit a gaseous exchange between the latter and the atmosphere, in both directions, thus enabling the level of fuel in the tank to lower as fuel is consumed, or rise as the fuel volume increases with increase in temperature, without producing a troublesome overpressure or vacuum in the tank.

In addition there must be compatibility with the new safety standards which call for limited leakage of fuel from the tank when the vehicle overturns and lead, consequently, more and more frequently to the use of a sealing gas cap.

SUMMARY OF THE INVENTION

The present invention describes a device situated on a side arm mounted on the tank filler pipe, consisting essentially of a natural or artificial elastomer diaphragm resistant to hydrocarbons, pierced by slits, held between the flanges of two concentric cylindrical elements constituting a valve body, a clearance being provided between the diaphragm and the flanges framing it so as to prevent the latter from producing stresses in the said diaphragm which would lead to deformation of the slits and would modify unpredictably the flow of gases through them.

However, the device described above determines for a given value of overpressure or vacuum within the fuel tank the same gas flow, but in opposite directions, through the slits in the diaphragm.

Now, it has been found that in the extreme case when the tank has become completely empty, the fuel pump continues operating for a period of time required for the carburetor float chamber to run dry. During this time the pump discharges a volume of air per unit of time well in excess of the volume of gasoline normally pumped. Consequently, a relatively high vacuum is created in the tank, since the slits in the diaphragm are designed for a gaseous exchange corresponding to the normal rate of drop in fuel level which, as has just been seen, occurs at a much lower rate of fuel discharge. This unexpected vacuum can be detrimental to the tank.

Moreover, it is not desirable to increase the permissible flow through the diaphragm by lengthening the slits, since this would likewise lead to increased permeability vis-a-vis the fuel in case the vehicle overturns.

An improved device overcoming the above drawbacks constitutes a first variant of the invention and prevents an excessive vacuum from developing in the tank while asymmetrically permitting a large gaseous flow into the tank equivalent or superior to the discharge of the fuel pump sucking air, while conserving, however, a limited flow in the opposite sense compatible with the safety standards in force.

The result is obtained through the fact that the flanges of the elements constituting supports for the diaphragm do not determine central openings of equal diameters.

On the contrary, the opening of the side closer to the tank is somewhat larger in diameter than that on the other side.

Thus, in case of overpressure inside the tank, the diaphragm is forced outwards against the samll diameter flange. Only the central part of the slit which remains free is operational. The fluid flow from the tank is determined then by the diameter of the opening of the flange and may be as low as the standards require.

In case of a high level of vacuum in the tank, as envisaged above when the fuel pump is sucking air, the diaphragm is forced against the large-diameter flange; the entire slit is operational and permits a considerably higher flow, avoiding any harmful vacuum in the tank. The diameters of the openings of the two flanges are calculated on the basis of the ratio of the flows to be provided in the two directions.

According to a second variant of the invention, there is situated within the valve body, close to the diaphragm provided with one or more slits, a stop against which the diaphragm is forced when the tank is pressurized, the effect being to neutralize a portion of the slits and thus to limit the gaseous flow through the diaphragm to a predetermined value.

BRIEF DESCRIPTION OF THE DRAWINGS

The present invention will be described by way of a non-restrictive example with reference to the attached FIGS. 1 to 18 in which.

DESCRIPTION OF THE PREFERRED EMBODIMENTS

Figure 1:
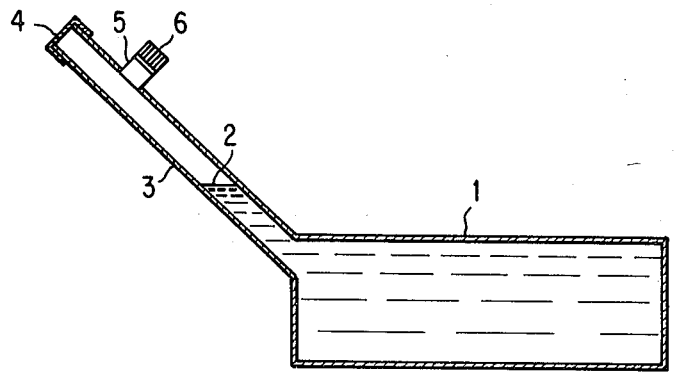
FIG. 1 is a longitudinal cross section of a fuel tank equipped with the device.
Figure 2:
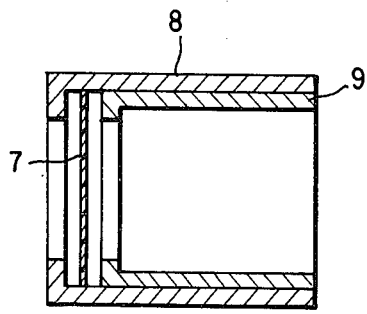
FIG. 2 is a longitudinal cross section of the safety device.

Referring now to the drawings, wherein like reference numerals designate identical or corresponding parts throughout the several views, and more particularly to FIG. 1 thereof, the tank in FIG. 1 is filled with fuel to a level 2 by way of a pipe 3 the upper end of which is closed by a sealing cap 4. A side arm 5 has at its free end the valve 6 of the invention, shown in greater detail in FIGS. 2 and 3.

It is seen that it is essentially constituted by a diaphragm 7 held between two concentric cylindrical elements 8 and 9 forming the valve body.

The diaphragm 7 is made from a natural or synthetic elastomer resistant to gasoline, its thickness is such that it retains some flexibility while having sufficient stiffness for its operation as described below. This is achieved with a diaphragm thickness of the order of 5/10 mm.

The elements 8-9 of the valve body are preferably made of molded plastic of the polypropylene type. The valve is compact with outer diameter and length both of the order of 14 mm.

The ends of the elements 8-9 near the diaphragm 7 are bent inwards to form stops for the said diaphragm. It should be noted that the latter is mounted in the valve with an axial operating play of 5/10 mm, as well as a smaller radial clearance of about 3/0 mm.

The aim of this is to eliminate mounting stresses in the diaphragm due to local deformations of its edges following clamping of them between the elements 8-9.

Figure 3:
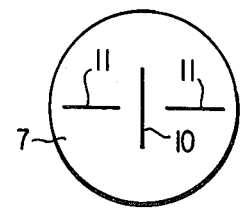
FIG. 3 is a fron view of the diaphragm used in the device.

FIG. 3 indicates that the diaphragm 7 has a number of slits with contacting edges which can open under the action of an overpressure exerted on one of its sides. This configuration is not the only one possible but has been chosen in preference to others which do not work as well.

It has a first slit 10 through the center of the diaphragm and two slits 11 along a diameter perpendicular to that along which slit 10 lies and situated on each side of the latter at a distance of about a millimeter. The length of these slits is adjusted to the gaseous flow required through the diaphragm (close to 35 l/hr); in the example of FIG. 3 it is preferably 2.5 mm.

Because of the absence of stress in the diaphragm 7 and its freedom due to the axial play, mentioned earlier, the slits 10-11 always maintain the same passage cross section and therefore permeability characteristics constant with respect to what has been initially determined. It would not be the same if the edges of the diaphragm were clamped between the ends of the elements 8-9 constituting the valve body, which would lead to a deformation of the diaphragm and an unpredictable increase in the area of the slits. One could not then predict, nor control the gaseous exchange flows through the latter necessary for the good operation of the tank.

Figure 4:
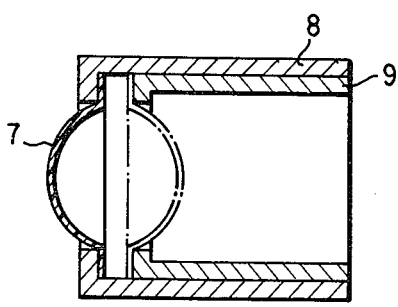
FIG. 4 is a longitudinal cross section of the device when the diaphragm is in its extreme positions.

On the other hand, the present configuration has an additional safety feature: in case of a sudden overpressure or vacuum, the diaphragm can leave its seat when sufficiently deformed as indicated in FIG. 4. This arrangement prevents damage to the tank.

Finally, in view of the mechanical properties of the diaphragm, when the vehicle is overturned the mere pressure of the fuel is not enough to force the edges of the diaphragm slits apart significantly, so that only a slow trickle of liquid (of the order of 30 cm$^3$/hr) can escape.

Figure 5:
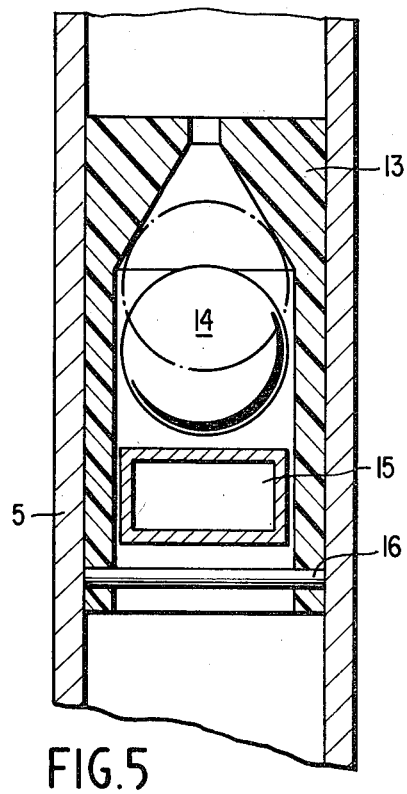
FIG. 5 is a longitudinal section of a variant of the invention.
Figure 6:
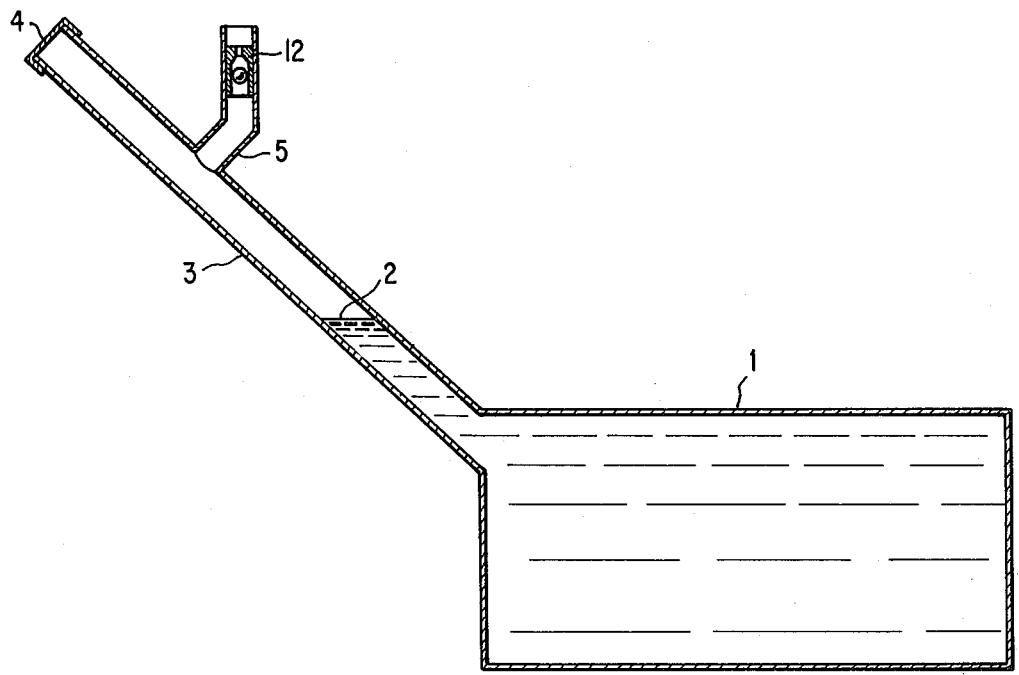
FIG. 6 is a longitudinal section of a view of a tank equipped with this variant.

A variant of the preceding arrangement, designated as a whole by 12 in FIGS. 5 and 6 illustrating it, is located as before at the free end of a side arm 5. It is equally compact since its length is of the order to 20 mm.

It consists essentially of a valve body 13 of plastic of polypropylene type, the outwardly directed part of which becomes conical and can serve as the seat for an inox steel ball 14; the latter can shift in the valve body 13 under the action of a float 15 of circular section, which can be solid, of a material such as cork, or hollow and of polypropylene. The displacement of movable parts, the diameter of which is of the order of 6 mm, is facilitated by the presence of a slight play with the valve body, near 5/10 mm. A pin 16 situated crosswise in the valve body limits the displacement of the float 15.

As is seen in FIG. 6, the device placed in the side arm 5 is vertical so that in normal operation the float 15 rests on the pin 16 and the ball 14 is not pushed against the conical part of the body 13; under these conditions a gaseous exchange can freely occur between the atmosphere and the tank by way of the clearance left between the movable elements and the valve body 13.

In case the gas tank is inverted, the pressure of the column of liquid in the side arm 5 pushes the float and drives the ball 14 against its seat. Under these conditions only a minimum flow of fuel is possible, compatible with safety standards.

The two devices described above may on the other hand, in view of their compactness, be incorporated in the cap itself which then has access to the open air downstream of the said devices. The side arm 5 is, then, no longer necessary.

Figure 7:
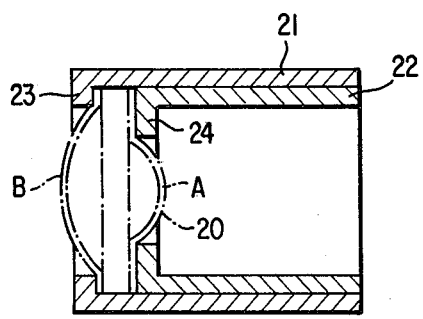
FIGS. 7 and 8 show a longitudinal cross section and a front view of the device.
Figure 8:
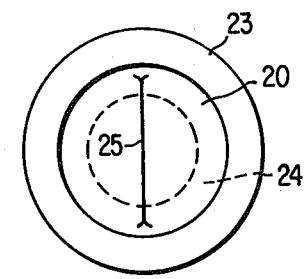

The valve, according to the first variant shown in FIG. 7, consists of a diaphragm 20 placed between two concentric cylindrical elements 21 and 22 constituting the valve body. It is located in the side arm on the tank filler pipe in such a way that the side of the diaphragm 20 facing the left of the figure is subjected to the internal tank pressure while its side facing right is subjected to atmospheric pressure.

As in the preceding arrangement, the diaphragm 20 is of a gasoline-resistant elastomer, the thickness of which is of the order of 5/10 mm. Similarly, the elements 21-22 of the valve body are preferably molded from the plastic of the polypropylene type.

An essential characteristic of the present invention is that the flanges 23-24 of the elements 21-22 forming the stops for the diaphragm 20 do not have central openings of equal diameter.

It will thus be noted that the opening on the side towards the tank (to the left of the figure) is somewhat larger in diameter than the other one.

Another characteristic of the present invention relates to the fact that the gaseous exchanges between the two sides of the diaphragm are effected through at least one, preferably diametral, slit 25 of length equal to the diameter of the opening of flange 23.

As in the first device described, the diaphragm 20 is mounted between the flanges 23 and 24 with an operational play, both radial and axial, of the order of some tenths of a millimeter.

The above valve works as follows:

In case of overpressure in the tank, the diaphragm 20 is pushed against the flange 24 (position A). Only the central part of the slit 25 which remains free is effective. The flow of fluid from the tank is determined therefore by the diameter of the opening of flange 24 and can be as small as the norms require.

In case of a high level of vacuum, an envisaged above when the fuel pump sucks air, the diaphragm 20 is pushed against the large diameter opening of flange 23 (position B); all of the slits 25 is effective and permits a considerably greater flow, preventing an injurious vacuum in the tank. The diameter of the openings of flanges 23-24 are calculated according to the ratio of flows to be provided for in the two directions.

Figure 9:
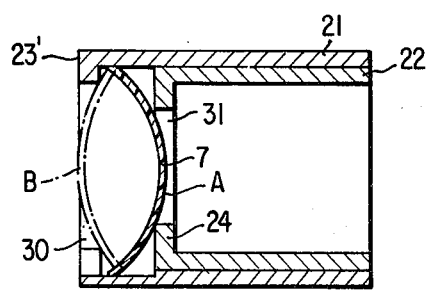
FIGS. 9 and 10 are similar views of a variant of the invention.
Figure 10:
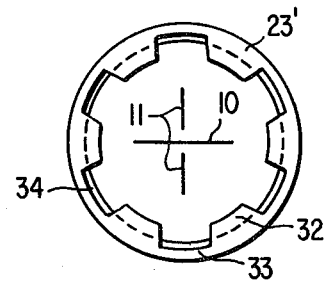

The variant illustrated in FIGS. 9 and 10 is an adaptation to the above system of the diaphragm 7 with 3 slits with the arrangement of FIG. 3.

Again there are the two concentric cylindrical elements 21 and 22 of FIG. 7 constituting the valve body, located as before in a side arm of the tank filler pipe and made preferably of molded polypropylene.

Similarly, the flanges 23' and 24 of the elements 21 and 22, respectively, determine openings 30-31 of different diameters, larger on the tank side (to the left of FIG. 9) than on the opposite side.

As in the arrangement of FIG. 1, the gasoline-resistant elastomer diaphragm 7, with slits 10 and 11, is mounted with a little operating clearance between the flanges 23' and 24.

The essential characteristic of the present variant resides in the fact that the free edge of the flange 23' is notched to form fingers 32. The diameter to the bottom 33 of the notches being greater than that of the diaphragm 7 there exists, then, a radial play 34 between the latter and certain zones of the flange 23'.

The operation of the above valve is effected between the two extreme positions A and B of FIG. 9.

During an overpressure in the tank, the diaphragm 7 takes the position A in which only the slits 10 and 11 permit an exchange between the sides of the said diaphragm.

During a vacuum in the tank, diaphragm 7 assumes the position B.

In this case, the passages formed by the radial play 34 between the bottom of the notches and the periphery of the diaphragm combine with the slits 10-11 and consequently increase the gaseous flow permitted in the direction of the tank under vacuum.

Figure 11:
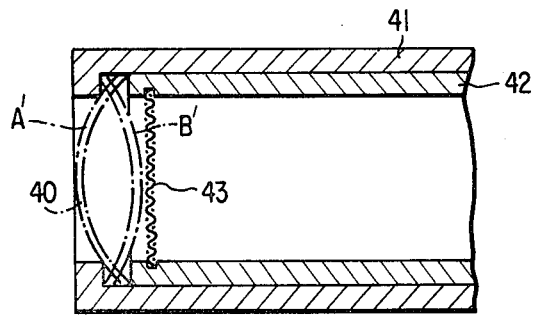
FIGS. 11 and 12 are the same views of a first device with a grill as diaphragm support.
Figure 12:
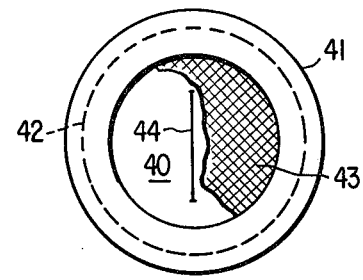

The valve, according to the second variant of the invention shown in FIG. 11, consists of a diaphragm 40 with at least one slit 44, located between two concentric cylindrical elements 41 and 42 constituting the valve body.

This is placed in the side arm on the tank filler pipe in such a way that the side of diaphragm 40 facing left in the figure is subjected to the pressure inside the tank while the side on the right is subjected to atmospheric pressure.

As in the arrangement of FIG. 1, the diaphragm 40 is of a gasoline-resistant elastomer, the thickness of which is of the order of 5/10 mm. Similarly, the elements 41-42 of the valve body are preferably molded from a plastic of the polypropylene type.

In contrast to the arrangement described in the first variant, the diaphragm shifts between the flanges of the concentric elements 41-42 with equal-diameter openings.

On the other hand, inside element 42, close to the diaphragm 40, there is a grill which serves as a stop for the said diaphragm when the tank is overpressured (position B'). A diametral slit 44 all the way through the thickness of the diaphragm, permits a gaseous exchange proportional to its curvature. It is seen, then, that, conformably with the effect sought, the flow will be less in position B' than in position A' in which no material obstacle limits the curvature of the diaphragm.

Figure 13:
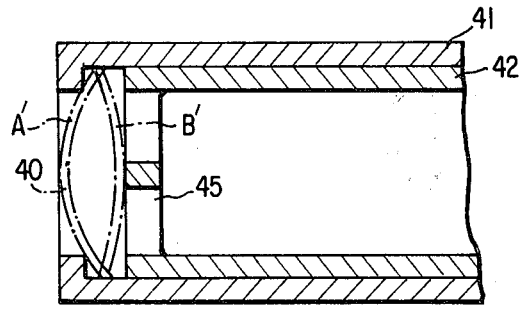
FIGS. 13 and 14 are similar views, the support being in the form of a cross.
Figure 14:
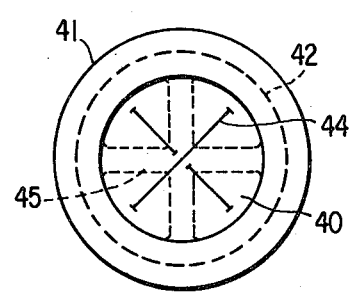

In the arrangement of FIGS. 13 and 14, the grill is replaced by a cross support, as shown in FIG. 14. The diaphragm in this case has a configuration of slits bisecting the open sectors outlined by the cross 45.

As in the preceding case, the above arrangement limits the displacement of the diaphragm during an overpressure in the tank (position B') and thus gaseous flow, with respect to what it can be when the diaphragm is in position A'.

However, an additional deformation of the diaphragm can be produced by higher pressure because of its bulging into the open sectors oulined by the cross.

This leads as a consequence to increased opening of the slits and increased gaseous exchange.

The preceding arrangement functions then at several pressure stages.

Figure 15:
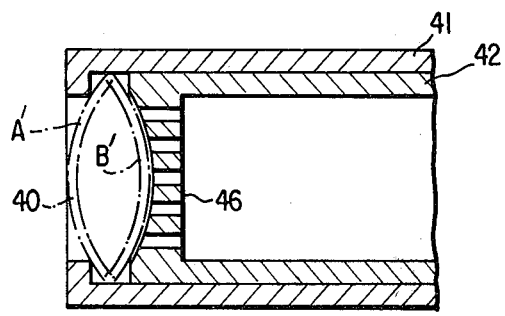
FIGS. 15 and 16 are similar views, the support being a concave partition with holes.
Figure 16:
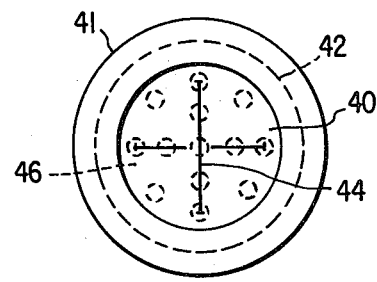

According to FIGS. 15 and 16, the diaphragm 40, in the presence of an overpressure in the tank (position B) is pressed against a concave wall 46 with holes through it through which escape the gases leaving the tank via the slits in the diaphragm which may be analogous to those in the preceding representation.

There is obtained through this arrangement an asymmetric deformation of the diaphragm leading to different flows depending upon whether it is in position A' or B'.

Figure 17:
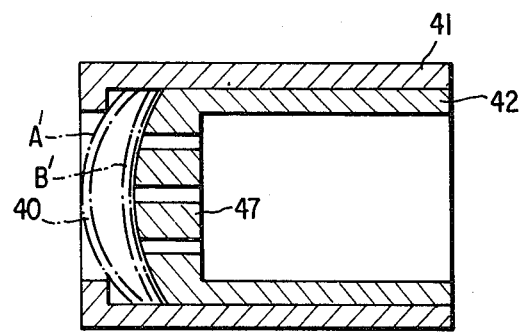
FIGS. 17 and 18 are similar views, the support being a convex partition with holes.
Figure 18:
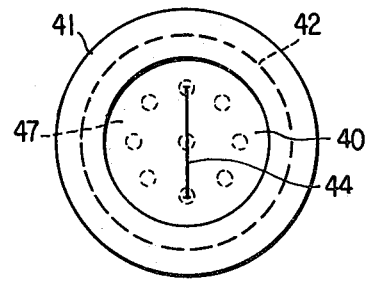

The arrangement of FIGS. 17 and 18 has a convex support wall 47 against which the diaphragm 40 rests, thus having an initial deformation corresponding to the admissible gaseous flow under pressure.

With the tank under vacuum (position A') the diaphragm 40 undergoes a deformation in the same direction, but greater, thus permitting a larger flow.

We claim:

1. A safety device for venting a fuel tank, particularly for automobiles, comprising:
   two concentric cylindrical elements having a plurality of flanges and constituting a valve body,
   a natural or synthetic hydrocarbon resistant elastomer diaphragm pierced by a plurality of slits and held between the flanges of the two concentric cylindrical elements constituting the valve body, a clearance being provided between the diaphragm and the flanges holding the diaphragm so as to prevent the flanges from causing stresses in the diaphragm capable of deforming the slits and modifying unpredictably gaseous flow through the slits.
2. The device recited in claim 1, wherein:
   a first one of the slits passes through the center of the diaphragm while two other slits are situated on a line perpendicular to the center of the diaphragm along the length of the first slit while being separated from the first slit.
3. The device recited in claim 1 including:
   means for mounting the valve body in a side arm on the filler pipe of the fuel tank.
4. The device recited in claim 1, wherein:
   one of the flanges is disposed on the side towards the tank and another of the flanges is disposed on the other side of the diaphragm and the central opening of the flange on the side towards the tank has a larger area than the opening of the flange on the other side of the diaphragm.
5. The device recited in claim 4, wherein:
   the diaphragm has at least one slit, preferably diametral, the length of the one slit corresponding to the diameter of the opening of the flange on the side towards the tank.
6. The device recited in claim 4, wherein:
   the flange on the side towards the tank is notched on its free periphery, the diameter to the bottom of the notches being greater than the diameter of the diaphragm, thus determining a radial clearance through which a gaseous flow can develop adding to the flow through the diaphragm slits when the tank is under vacuum.
7. The device recited in claim 1, including:
   a stop located inside the valve body close to the diaphragm, the diaphragm being pressed against the stop when the tank is pressurized, the effect being to neutralize a portion of the slits and thus limit the gaseous flow through the diaphragm to a predetermined value.

8. The device recited in claim 7, wherein: the stop consists of a grill.

9. The device recited in claim 7, wherein: the stop consists of a cross, the diaphragm slits bisecting the sectors determined by the cross.

10. The device recited in claim 7, wherein: the stop consists of a concave wall pierced with holes.

11. The device recited in claim 7, wherein: the stop consists of a convex wall pierced with holes, the diaphragm being in contact with the wall even in its position of rest.

* * * * *